Nov. 13, 1962  H. A. MAEDER  3,064,261
AUTOMATIC CHART CHANGER
Filed March 9, 1959  4 Sheets-Sheet 1

INVENTOR
Henry A. Maeder
BY
ATTORNEY

Nov. 13, 1962   H. A. MAEDER   3,064,261
AUTOMATIC CHART CHANGER
Filed March 9, 1959   4 Sheets-Sheet 2

INVENTOR
Henry A. Maeder

BY
ATTORNEY

Nov. 13, 1962  H. A. MAEDER  3,064,261
AUTOMATIC CHART CHANGER
Filed March 9, 1959  4 Sheets-Sheet 3

Fig. 7
Fig. 8
Fig. 9
Fig. 10
Fig. 11
Fig. 12
Fig. 13

INVENTOR
Henry A. Maeder

BY
ATTORNEY

Nov. 13, 1962                    H. A. MAEDER                    3,064,261
                              AUTOMATIC CHART CHANGER
Filed March 9, 1959                                              4 Sheets-Sheet 4

INVENTOR
Henry A. Maeder

BY *(signature)*
ATTORNEY

United States Patent Office 3,064,261
Patented Nov. 13, 1962

3,064,261
AUTOMATIC CHART CHANGER
Henry A. Maeder, Dallas, Tex., assignor to Orvel E. Mullins, Dallas, Tex.
Filed Mar. 9, 1959, Ser. No. 798,001
20 Claims. (Cl. 346—137)

This invention relates to chart changing devices for recording instruments and to charts usable with such chart changers.

An object of this invention is to provide a new and improved chart changer.

Another object of the invention is to provide an automatic chart changer for recording instruments.

Still another object of the invention is to provide a new and improved chart changer having a rotatable chart plate on which a plurality of juxtaposed charts may be positioned and having automatic means for periodically removing the outermost chart of the stack of juxtaposed charts from the chart plate.

A further object of the invention is to provide a chart changer wherein the outermost chart of juxtaposed charts is removed from the chart plate upon the completion of each revolution of the chart plate.

A still further object of the invention is to provide a new and improved chart changer which includes a rotatable chart plate having a retainer for holding a stack of juxtaposed charts on the chart plate which releases the outermost chart upon the completion of each revolution of the chart plate to fall under the influence of gravity into a chart receptacle or receiver.

Another object of the invention is to provide a chart changer having a main shaft, on which the chart plate is non-rotatably but longitudinally movably mounted, which is biased toward the retainer, the retainer being rigidly secured to a release shaft.

Still another object of the invention is to provide a chart changer wherein the release shaft and the plate shaft are driven in synchronism whereby the retainer is rotated through a predetermined angle once during each complete revolution of the plate shaft to cause the retainer to move out of contact with the outermost chart of the stack of charts disposed on the chart plate to permit the outermost chart to fall free of the chart plate.

A still further object of the invention is to provide a chart changer for use with a stack of juxtaposed charts having central apertures from which radial slots extend, the radial slots of adjacent and abutting charts of the juxtaposed charts being angularly displaced from one another, whereby the rotational movement of the retainer upon the completion of each revolution of the chart plate moves the retainer out of contact with the outermost chart and into alignment with the radial slot thereof and into contact with the outer surface of the next outermost chart of the stack of juxtaposed charts whereby the outermost chart is permitted to fall free of the chart changer while the retainer continues to hold the remaining charts on the chart plate.

Another object of the invention is to provide a chart changer which operates periodically to remove the outermost chart of a stack of juxtaposed charts held on a chart plate and which functions without regard to the varying thicknesses of the individual charts of the stack of charts.

Still another object of the invention is to provide a chart changer wherein the plate shaft and the retainer plate shaft are actuated by a single prime mover, such as a spring wound clock mechanism.

A further object of the invention is to provide a chart changer wherein the retainer is removably secured to the retainer shaft whereby the retainer may be easily detached from the chart changer to permit easy removal and replacement of the charts on the chart plate.

A still further object of the invention is to provide a chart changer having a chart plate wherein the chart retainer rotates three-fourths of a turn for each complete turn or revolution of the chart plate whereby the retainer permits the outermost chart of a plurality of juxtaposed charts to fall free of the chart changer plate, the charts being provided with radial slots extending from the inner central apertures thereof, the radial slots extending at right angles to one another in adjacent abutting charts.

A still further object of the invention is to provide a chart changer wherein the retainer is rotated at a different rate than the chart plate whereby the retainer rotates relative to the chart plate.

Another object of the invention is to provide a chart changer having a retainer which is rotated rapidly through a predetermined angle upon the completion of a complete revolution of the chart plate to effectuate a quick release of the outermost chart.

Still another object of the invention is to provide a chart plate and a chart retainer plate which are rotatable about a concentric axis and wherein the retainer is provided with a downwardly and forwardly extending outer surface to facilitate downward outward movement of the outermost chart upon actuation of the retainer to release the outermost chart of a stack of charts held on the chart plate by the retainer.

Additional objects and advantages of the invention will be readily apparent from the reading of the following description of a device constructed in accordance with the invention, and reference to the accompanying drawings thereof, wherein:

Referring now particularly to FIGURES 1 through 4 of the drawings, the chart changer 20 is shown secured to the back wall 21 of the case 22 of a recording instrument 23. The recording instrument has a suitable pen 24 driven by any suitable actuating means which is responsive to the rate or volume of flow of a fluid, variations in temperature, variations in pressure, or any other variable. The pen point 25 of course bears very slightly against the outermost chart 28a of the stack of charts 28 disposed on a rotatable chart plate 30 of the chart changer 20.

Figures 1, 2, 3:
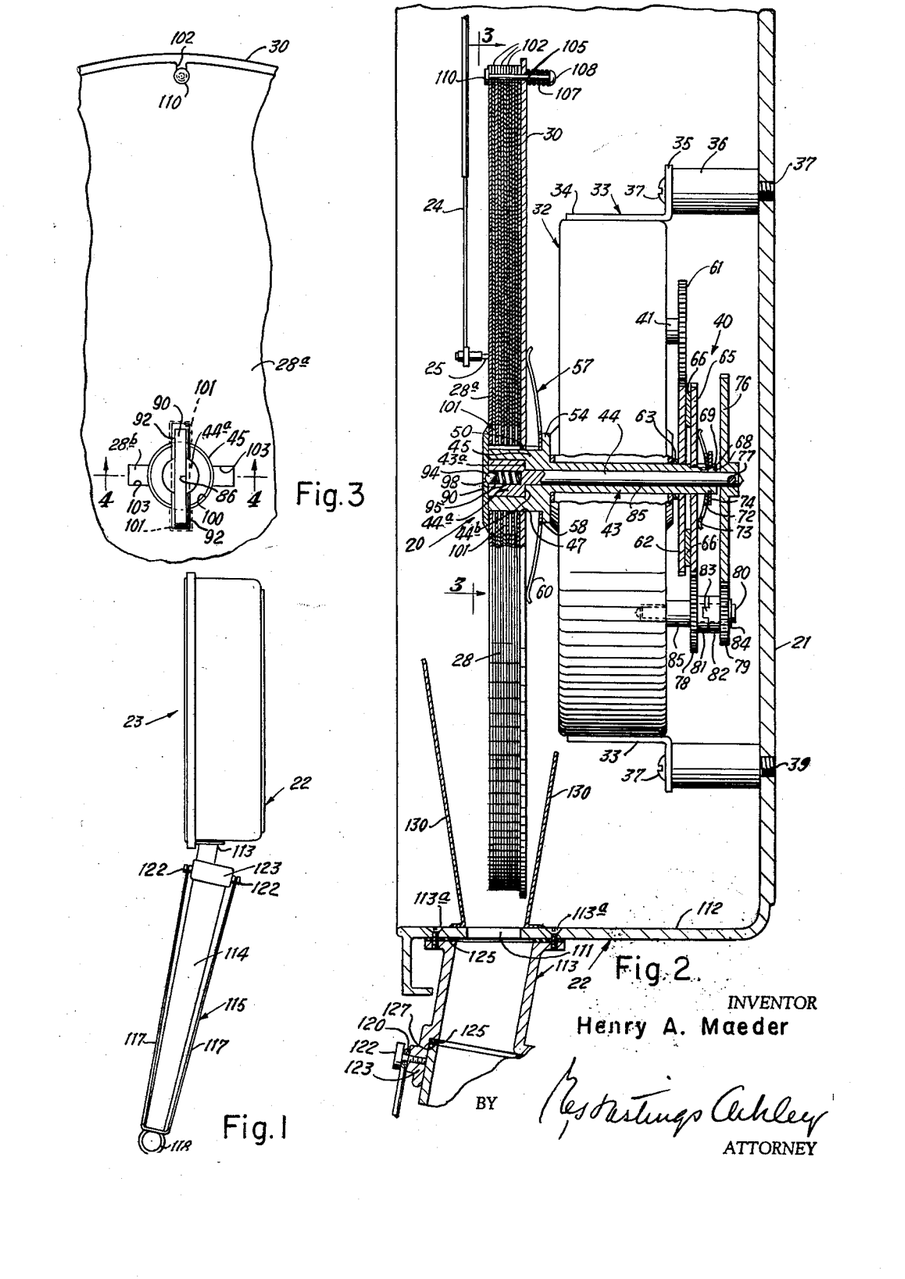
FIGURE 1 is a side plan view of a recording instrument provided with a chart changer embodying the invention.
FIGURE 2 is a fragmentary enlarged vertical sectional view of the chart changer illustrated in FIGURE 1.
FIGURE 3 is a view taken on line 3—3 of FIGURE 2.
Figure 4:
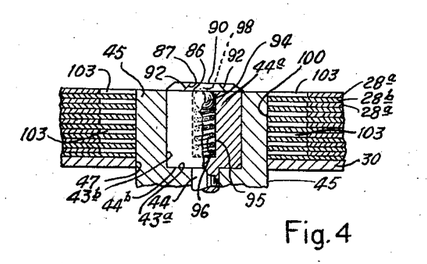
FIGURE 4 is a sectional view taken on line 4—4 of FIGURE 3.

The chart changer 20 includes a suitable prime mover 32, which may be a spring wound clock mechanism, which is mounted to the rear wall 21 of the case 22 by means of brackets 33. The brackets have arms 34 which are riveted, welded or in any other manner rigidly secured to the prime mover and angularly outwardly extending arms 35 secured to stand-offs 36 by means of screws 37. The stand-offs 36 may be tubular so that the screws 37 extend therethrough into threaded bores provided in the back wall 21 of the case 22. The stand-offs 36 hold the prime mover 32 spaced from the rear wall 21 to provide room for the transmission 40 which connects the driving shaft 41 of the prime mover to the chart plate shaft 43 and the retainer shaft 44.

The hollow chart plate shaft 43 extends through the housing of the prime mover 32 in the usual manner and is provided with an enlarged forward portion 45 which is adapted to extend through the central aperture 47 of the chart plate 30. The enlarged forward portion 45 of the chart plate shaft is also provided with an external longitudinal key slot 49 in which is received the key portion 50 of the chart plate which extends inwardly into the central aperture 47 thereof so that the chart plate is non-rotatably positioned on the enlarged forward portion 45 of the chart plate shaft 43 but is free to move longitudinally thereon.

Figures 7, 8, 9, 10, 11, 12, 13:
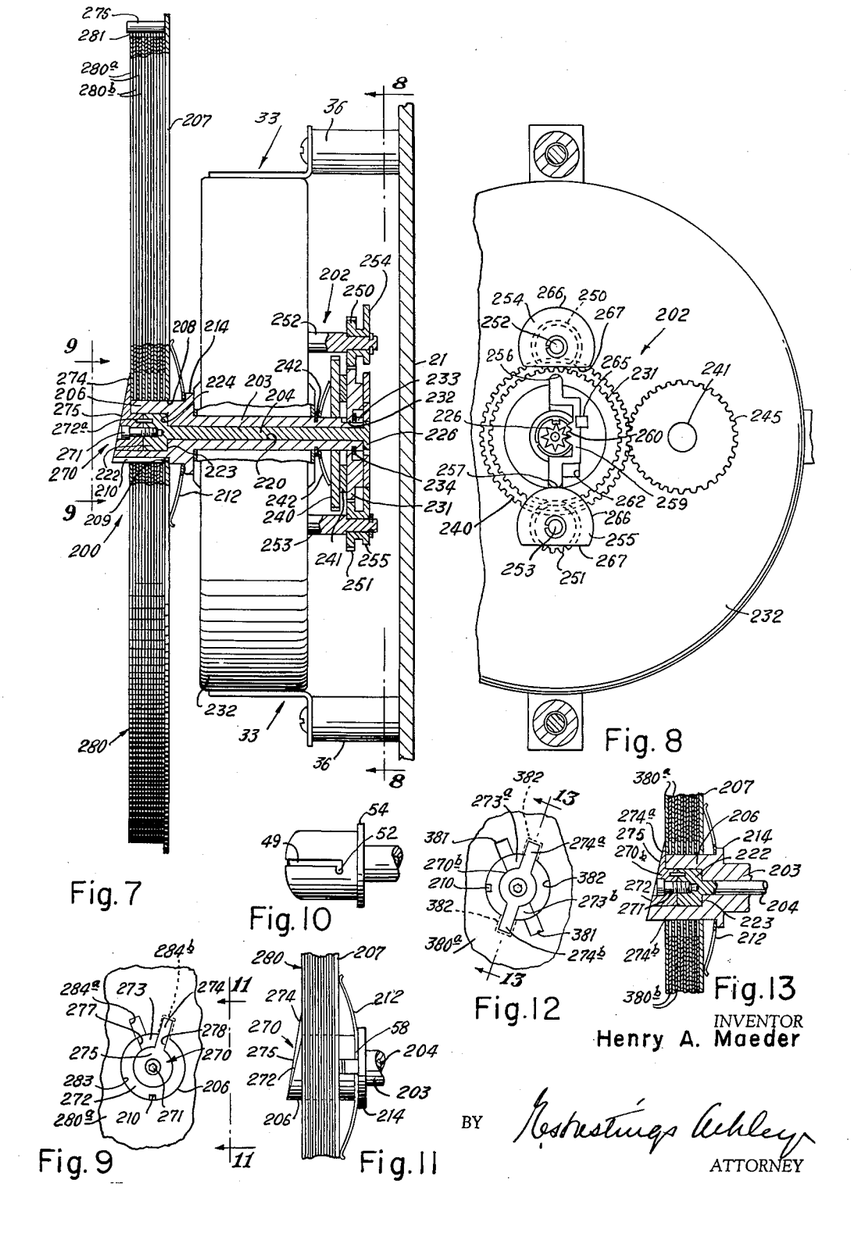
FIGURE 7 is a fragmentary vertical sectional view of another modified form of the chart changer embodying the invention.
FIGURE 8 is a sectional view taken on line 8—8 of FIGURE 7.
FIGURE 9 is a fragmentary view taken on line 9—9 of FIGURE 7.
FIGURE 10 is a fragmentary side view of the outermost end of the chart plate shaft.
FIGURE 11 is a vertical sectional view taken on line 11—11 of FIGURE 9.
FIGURE 12 is a fragmentary front view of a modified form of retainer and of the charts for use therewith which may be used in place of the retainer and charts illustrated in FIGURES 9 through 11.
FIGURE 13 is a sectional view taken on line 13—13 of FIGURE 12.

If desired, the key slot 49 may be provided with an off-set portion 52, FIGURE 10, adjacent the external flange 54 of the plate shaft 43 so that the plate may be rotated on the plate shaft to position the key 50 in the off-set portion 52 of the slot when it is desired to prevent forward movement of the chart plate on the plate shaft.

The chart plate 30 is yieldably biased forwardly on the plate shaft by a spring 57 which has a central flat body 58 provided with a central aperture for receiving the enlarged portion 45 of the plate shaft and with a plurality of forwardly and outwardly extending arms or leaves 60 whose forward ends bear against the back side of the chart plate 30. Rearward movement of the central body of the spring is prevented by its abutment with the external flange 54 of the plate shaft.

The driving shaft 41 of the prime mover 32 is provided with a gear 61 rigid therewith which meshes with a gear 62 rotatably disposed on the plate shaft 43. A bearing 63 interposed between the prime mover 32 and the gear 62 limits forward movement of the gear 62 on the plate shaft. The gear 62 together with a gear 65 constitutes a clutch mechanism. The gear 65 is longitudinally slidably but non-rotatably mounted on the plate shaft 43 rearwardly of the gear 62. An annular clutch pad 66, bonded by means of an adhesive or any other suitable means to the clutch gear 65, is made of suitable material such as felt to provide the desired frictional engagement between the gear 62 and 65. The gear 65 is provided with a key portion 68 which extends into the key slot 69 on the rear portion of the plate shaft 43 so that the clutch gear 65 may slide longitudinally toward and away from the gear 62 but is prevented for rotating relative to the plate shaft 43. The clutch gear 65 is biased toward the gear 62 by a spring 72 whose leaves or arms 73 abut the rear surface of the clutch gear 65 and whose central body bears against a split retainer ring 74 disposed in a suitable annular recess of the chart shaft 43.

It will thus now be apparent that due to the frictional engagement of the clutch pad 66 with the gear 62, rotation of the gear 62 will cause the clutch gear 65 to rotate and thus cause the plate shaft 43 to rotate therewith.

The retainer shaft 44 has its rear end extending rearwardly of the plate shaft 43 and is provided with a gear 76 rigidly secured thereto by any suitable means, such as a pin 77 which extends through suitable aligned apertures in the hub of the gear 76 and in the rear end of the retainer shaft. The clutch gear 65 is connected to the retainer shaft gear 76 by gears 78 and 79 rotatably mounted on a stub shaft 80 secured to the prime mover 32. The gears 78 and 79 are provided with hubs 81 and 82 respectively which are connected together by a tongue and slot connection 83 which causes gear 79 to rotate whenever the gear 78 rotates. The gears 78 and 79 are held on the stub shaft 80 by a retainer ring 84 which bears against the rear side of the gear 79. A spacer sleeve 85 bears against the front side of the gear 78 and against the rear side of the prime mover 32.

It will now be apparent that when the prime mover 32 is operating, the driving shaft 41 thereof will rotate causing the plate shaft 43 and the retainer shaft 44 to rotate simultaneously. The relative rates of rotation of the two shafts are dependent on the relative numbers of teeth of the gears 65, 78, 79 and 76. These gears are so selected as to cause the retainer shaft 44 to lag behind ¼ of a revolution or turn each time the plate shaft 43 makes a full revolution.

The forward portion 44a of the retainer shaft is enlarged to provide an annular rearwardly facing shoulder 44b which abuts the annular forwardly facing shoulder 43a provided by an enlarged portion 43b of the central bore of the hollow shaft 43 through which the retainer shaft 44 extends. The forward end of the enlarged portion of the retainer shaft 44 projects forwardly of the forward end of the plate shaft and is provided with a transverse slot 86 whose side edges are defined by inwardly and forwardly extending shoulders so that the retainer 90 having side shoulders 92 of corresponding configuration may be slid into the slot 86 from one end thereof to an operative position wherein end portions thereof extend outwardly on each side of the enlarged portion 45 of the chart plate shaft 43.

The retainer 90 is held in position by a ball detent 94 disposed in a longitudinal bore 95 in the forward end of the retainer shaft 44. The ball detent is biased forwardly by a spring 96. The rear side or surface of the retainer 90 is provided with a recess 98 into which the ball detent 94 extends when the retainer plate is properly centered in the slot 86 on the retainer shaft 44. It will be apparent of course that the retainer 90 may be slid outwardly of the slot 86 by the exertion thereon of a force sufficient to overcome the force of the spring 96.

The charts 28 held on the chart plate 30 are all provided with central apertures 100 through which the enlarged portion 45 of the chart shaft 43 may extend so that the stack of charts may be positioned on the chart plate by sliding the charts over the enlarged portion 45.

The charts 28b are provided with radial slots 101 which are aligned with peripheral slots 102 thereof while the charts 28a, one of which is interposed between each pair of adjacent charts 28b, are provided with radial slots 103 which extend at right angles to the peripheral radial slots 102 thereof.

An aligning and drive pin 105 extends through the peripheral radial slots 102 of the charts 28 to hold the charts in the desired alignment and to cause the charts to rotate with the chart plate 30 without slippage thereon. The driver pin 105 may extend through a suitable aperture in the chart plate 30 and is biased rearwardly by a spring 107 disposed about the driver pin 105 whose opposite ends about a head 108 of the pin and the rear end of the chart plate. The forward end of the driver pin 105 is provided with an annular button or flange 110 which is larger in diameter than the width of the peripheral radial slots 102 of the charts so that the flange 110 abuts the outermost chart 28 and yieldingly biases or pulls it toward the chart plate 30. The radial slots 103 of the charts 28a and the radial slots 101 of the charts 28b extend outwardly of the central apertures 100 of the charts 28a and 28b a distance sufficiently great that the retainer 90 will pass therethrough when the retainer 90 is aligned with such radial slots of the charts 28a and 28b.

It will thus be apparent that if the retainer 90 is rotated a quarter turn relative to the plate shaft 43, and therefore to the chart plate 30 and the charts held against rotation thereon by the driver pin 105, the retainer will alternately be aligned with the radial slots 103 of the charts 28a and then with the radial slots 101 of the charts 28b.

It will now be seen that, as illustrated, the retainer 90 bears against a chart 28a which is the outermost chart on the chart plate 30 and that the ends of the retainer which extend outwardly of the enlarged forward portion 45 of the chart shaft abut the outer forward surface of the outermost chart and prevent it from moving forwardly and outwardly of the chart plate. When the retainer however is rotated a quarter turn relative to the chart plate and therefore relative to the forward enlarged portion 45 of the chart shaft, the outer portions of the retainer become aligned with the radial slots 103 of the outermost chart 28a which is then free to move forwardly of the retainer since the retainer 90 will now pass through the radial slots 103. The outermost chart 28a will move forwardly since the chart plate and the whole stack of charts are biased forwardly by the spring 58.

The charts so released fall downwardly by force of gravity through an aperture 111 in the lower wall 112 of the case 22 into a downwardly and forwardly extending chute 113 which is secured to the bottom wall 112 of the case 22 by means of screws 113a or any other suitable manner. A chart receptacle 114 is secured to the chute 113 by a latch 115 so that the released chart falls through the chute 113 into the receptacle 114.

The latch 115 comprises a resilient member having forward and rear arms 117 which are connected together by a coil 118 at the lower ends thereof and whose upper ends are provided with hooks 120 which extend about screws 122 threaded in suitable bores in the front and rear sides of a flange 123 of the chute 113. Gaskets 125 may be interposed between the bottom wall 112 and the upper end of the chute 113 and between the upper end of the receptacle 114 and a downwardly facing shoulder 127 formed by the flange 123 of the chute 113, the upper end of the receptacle telescoping into the lower enlarged flange or end 123 of the chute 113. It will be apparent that the insertion of a finger in the coil 118 and a downward pull thereon will cause the resilient latch 115 to elongate so that the latch may be pivoted about the screws 122 out of engagement with the lower end of the receptacle 114 to free it for downward movement out of the flange 123 of the chute 113 relative to the case 22 and that by reversing this sequence of operation the receptacle may be secured to the chute 113.

If the retainer 90 is now rotated another quarter turn or revolution relative to the chart plate and chart shaft the outer ends of the retainer will come into alignment with the central radial slots 101 of the chart 28b which is now the outermost chart. This chart 28b will now be free to move forward under the force exerted by the spring 58 to fall free of the chart plate and into the receptacle 114.

In use, when it is desired to load a stack of charts 28a and 28b on the chart plate 30, the chart plate is moved rearwardly against the resistance of the spring 58 and is then rotated slightly in order that the key portion 50 of the chart plate moves into the offset portion 52 of the key slot 49. The engagement of the key portion 50 in the offset portion 52 of the key slot of course now prevents forward longitudinal movement of the chart plate on the plate shaft 43. The retainer 90 is removed by withdrawing it longitudinally of the slot 86.

The stack of charts 28a and 28b, aligned in such positions relative to one another so that the peripheral longitudinal slots 102 are properly aligned and so that the radial slots 101 and 103 are disposed at right angles to one another, is then placed on the chart plate 30 with the enlarged portion 43 of the plate shaft extending through the central apertures 100 of the charts. The driving and aligning pin 105 of course is received in the slots 102 of the charts, the pin being pushed forwardly against the resistance of the spring 107 to facilitate assembly of the charts on the plate. The force of the spring 107 then causes the flange 110 of the pin 105 to hold the charts against the chart plate 30. After the charts have been assembled on the enlarged portion 43 of the shaft, the retainer 90 is slid into the slot 86 until the ball detent 94 enters into the internal recess 98 in the rear surface of the retainer. The retainer is now properly centered on the retainer shaft 44 and its outer end portions extend outwardly of the enlarged portion 45 of the plate shaft. The chart plate 30 is now rotated on the plate shaft to move its key portion 50 out of the offset portion 52 whereby the plate and the stack of charts are biased forwardly against the retainer 90.

The retainer 90 is now so aligned relative to the charts and the chart plate that at the end of each revolution it will be aligned alternately with the peripheral slots 102 and therefore also with the slots 101 of the charts 28b or is disposed perpendicularly to the peripheral radial slots 102 and in alignment with the slots 103 of the charts 28a. The pen 25 of the recording instrument is then allowed to touch the outermost chart 28a.

The recording instrument is then placed in operation with the prime mover rotating the chart plate 30 in order to obtain a recording of the variable being measured and recorded by the recording instrument. As was explained above, upon the completion of one revolution of the chart plate 30, due to the difference in the number of teeth on the various gears, the retainer shaft 44 will have completed only three-quarters of a revolution in order that the retainer 90 now be positioned in alignment with the slots 103 of the outermost chart 28a. As a result, the retainer no longer abuts the forward surface of the outermost chart, which is then free to move forwardly of the retainer plate, being urged to do so by the force of the spring 58. The outermost chart then slides downwardly through the aperture 111 of the case 112 and the chute 113 into the chart retainer 114. The chart plate of course continues to rotate and upon the completion of the next revolution of the chart plate the retainer 90 is aligned with the slots 101 of the charts 28b and, since the outermost chart is now a chart 28b, the retainer again will pass through the slots 101 of the chart 28b which is forced outwardly by the pressure of the force of the spring 58 and falls downwardly into the receptacle, whereupon the retainer engages the next chart 28a during the next revolution of the chart plate. In this manner, the charts 28a and 28b are successively removed or changed from the chart plate 30 so that the recording instrument will leave a continuous record of the variable it measures upon the plurality of charts received in the receptacle 114. The charts of course may be numbered so that they may be arranged in proper sequence upon removal from the receptacle 114, although normally they will be arranged in sequence in the retainer.

If desired, guides 130 may be secured to the bottom wall 112 of the case 22 of the recording instrument to guide the charts during their passage through the aperture 111 in the bottom wall 112.

It will now be seen that a new and improved chart changer for recording instruments has been illustrated and described which includes a chart plate, longitudinally movably mounted on a plate shaft, upon which a plurality of charts 28a and 28b may be alternately stacked, the charts having central apertures for receiving the enlarged portion 45 of the plate shaft.

It will further be seen that the charts 28a and 28b are provided with radial slots 103 and 101 respectively which extend outwardly from their central apertures 100 in order that the retainer plate 90 which engages the outer surface of the outermost chart of the stack of charts may alternately pass through the slots 101 and 103 to permit each chart as it becomes the outermost chart to be removed and fall from the chart plate under the influence of a spring which biases the chart plate outwardly toward the retainer.

It will further be seen that the retainer is mounted on a shaft which extends through the hollow plate shaft 43 and that a prime mover 32 is provided which causes both the chart plate 30 and the retainer 90 to rotate simultaneously but at varying speeds so that upon each revolution of the chart plate the retainer 90 revolves less than one full turn whereby it rotates only three-fourths of a turn to be alternately aligned with the slots 101 and 103.

It will further be seen that the charts 28a and 28b are all provided with aligned peripheral radial slots 102 for receiving a driving and retaining pin 105 and that the peripheral radial slots 102 are aligned with the slots 101 of the charts 28b and that the radial slots 103 of the charts 28a extend perpendicularly relative to the peripheral radial slots 102.

It will further be seen that the retainer 90 is so positioned relative to the chart plate 30 that upon the completion of each revolution of the chart plate the retainer 90 is either aligned with the slots 102 of the charts or else is disposed perpendicularly relative thereto, the slots 102 upon the completion of each rotation of the chart plate being disposed in an upper position to facilitate removal of the outermost chart from the chart plate.

Figure 5:
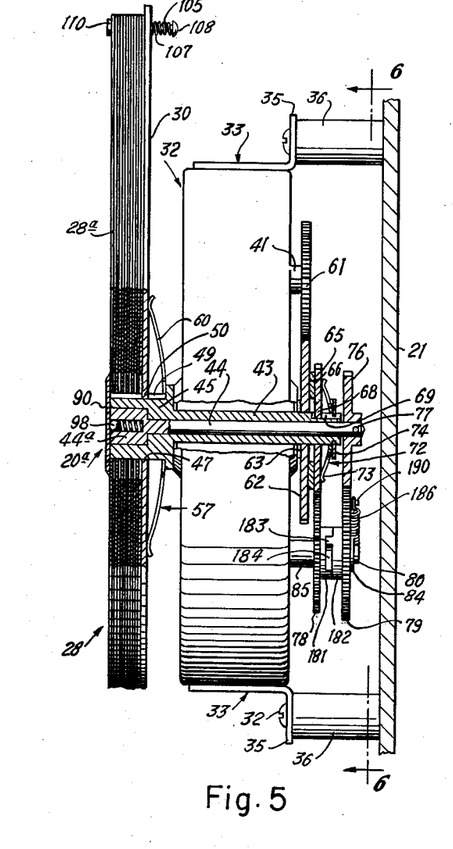
FIGURE 5 is a fragmentary partly sectional view of a modified form of the chart changer embodying the invention.
Figure 6:
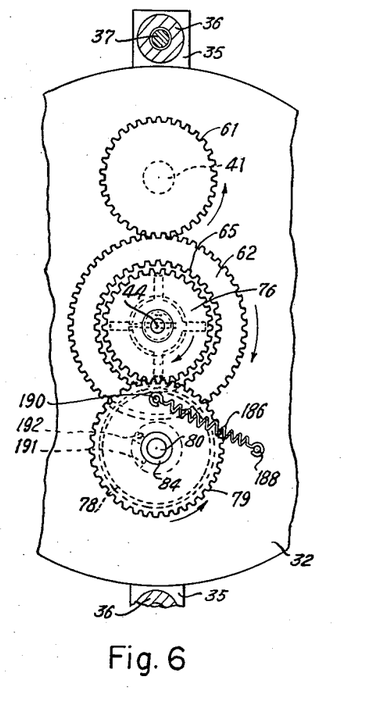
FIGURE 6 is a sectional view taken on line 6—6 of FIGURE 5.

In FIGURES 5 and 6 is illustrated a chart changer 20a which is identical in all respects with the chart changer 20 except that its hubs 181 and 182 provide a lost motion connection between the gears 78 and 79. Corresponding elements of the chart changer 20a which are identical with the corresponding elements of chart changer 20 have accordingly been provided with identical reference numbers. The hub 182 of the gear 79 is provided with a tongue 183 which is disposed in the slot 184 of the hub 181 of the gear 78. The slot 184 extends over an acute angle while the tongue 183 extends over a lesser angle so that relative movement may take place between the gear 78 and the gear 79 and therefore allow movement of the retainer shaft 44 while the chart shaft 43 and chart plate 30 are relatively stationary.

A spring 186 has one end secured to a pin 188 of the prime mover 32 and has its other end secured to a pin 190 secured to the gear 79 and extending outwardly rearwardly therefrom. The gears 65, 78, 79, and 76 are provided with such numbers of teeth as to cause the retainer shaft 44 to rotate one and one-quarter revolutions or turns during each one complete revolution of the chart plate shaft 43. The plate shaft and the retainer shaft rotate in the same directions.

As viewed in FIGURE 6, it will be apparent that the gear 79 rotates in a counterclockwise direction and that the pin 190 and the shoulders 191 and 192 defining the edges of the slot 184 of the hub 181 are so arranged that upon the completion of each revolution of the chart plate 30, the spring 186 will cause the gear 79 and therefore the gear 76 and retainer shaft 44 to rotate quickly through an angle of approximately ninety degrees to effectuate a quick rotation of the retainer shaft relative to the chart plate 30. It will be apparent that the gear 79 will rotate with the gear 78 when the key 183 is abutted by the shoulder 192 and that both the retainer 90 and the plate 30 will then rotate simultaneously while the tension in the spring 186 increases until the chart plate has rotated a full revolution and the peripheral radial slots of the charts and the aligning pin 105 are at their highest positions as illustrated in FIGURE 5. At this time further continued rotation of the chart plate will cause the gear 79 to move rapidly through an angle of approximately ninety degrees as the key 183 moves through this slot 184 to engage the shoulder 191 of the hub 181 as the spring moves past a dead center position and kicks over. This in effect results in a quick release mechanism and a quick successive release of the charts.

Referring now to FIGURES 7, 8, 9, 10 and 11 of the drawings, the modified chart changer 200 includes a transmission 202 between the driving shaft 241 of the prime mover 232 and the chart shaft 203 and retainer shaft 204 which causes the retainer shaft 204 to rotate alternately in opposite directions through predetermined angles upon each complete revolution of the chart shaft 203.

The plate shaft 203 is provided with an enlarged forward portion 206 on which is received a chart plate 207 having a central aperture which telescopes over the enlarged forward portion 206 of the plate shaft. The chart plate is provided with a key portion 209 which projects into the central aperture 208 thereof and into a longitudinal key slot 210 of the plate shaft in order that the chart plate 207 be movable longitudinally on the plate shaft but be rotatable therewith. A spring 212 having a central aperture through which the enlarged portion of the plate shaft extends is interposed between a flange 214 of the plate shaft and the rear surface of the chart plate 207 to bias the chart plate forward on the plate shaft.

The retainer shaft 204 extends through the central bore 220 of the plate shaft and has a forward enlarged portion 222 which provides an annular shoulder 223 which bears against a shoulder 224 of the plate shaft provided by a forward enlargement of the central bore 220 thereof. The opposite end of the retainer shaft 204 is provided with a gear 226 which is rigidly secured to the rear end portion of the retainer shaft 204 extending rearwardly of the rear end of the plate shaft 203. The driving shaft 241 of the prime mover 232 is provided with a gear 245.

A gear 231 is non-rotatably mounted on the plate shaft 203 by means of a key portion 232 which extends into a longitudinal slot 233 of the rear end of the plate shaft 203. A split ring 234 which is received in a suitable external groove of the plate shaft limits rearward longitudinal movement of the gear 231 on the plate shaft.

The gear 231 is driven by the gear 240 which is rotatably and longitudinally movably mounted on the plate shaft 203. An annular clutch pad 244 is adhesively or otherwise bonded to the gear 240 whereby the frictional engagement of the pad 244 with the gear 231 causes simultaneous rotation of the gear 231 when the gear 240 is rotated. The gear 240 is biased rearwardly toward the gear 231 by a spring 242 which is held against forward movement on the shaft by a split ring 243 suitably received in an annular groove or recess of the plate shaft 203. The gear 240 in turn is driven by the gear 245 rigidly secured to the driving shaft 241 of the prime mover 232. The gear 231 is in mesh with a pair of cam gears 250 and 251 disposed on opposite sides thereof and rotatably mounted on stub shafts 252 and 253 respectively extending from the prime mover 232. The cam gears are provided with cams 254 and 255 which are adapted to engage the cam follower ends 256 and 257 of a rack 259 mounted for reciprocal movement in a recess 262 of the gear 231. The rack 259 has gear teeth 260 which mesh with the gear 226 of the retainer shaft 204.

It will be apparent that the rack is maintained in place in the recess 262 by a suitable retainer 265 which abuts the outer rear surface of the rack to prevent its rearward movement therefrom. Each of the cams 254 and 255 is provided with an arcuate cam surface 266 and a flat surface 267.

It will be apparent that as the gear 231 rotates, it rotates the gears 250 and 251 which in turn causes the cam surfaces 266 of the cams 254 and 255 to alternately engage the cam ends 256 and 257, respectively, of the rack 259 to cause it to move radially in the recess 262 of the gear 231 each time the gear 231 rotates through a complete revolution. During one revolution of the gear 231 the rack 259 will be caused to move in one direction on the gear 231 and during the next revolution of the gear 231 the rack will be caused to move in the opposite direction on the gear 231.

It will also be apparent that during one revolution of the gear 231, as the gear 231 rotates to cause the rack 259 to move between the cams 254 and 255, one of the cams will present its cutaway or flat portion 267 toward its adjacent cam end 256 or 257 of the rack so that the rack will not be contacted by such cam. The cam 254 or 255 which does engage such cam end 256 or 257 of the rack will cause the rack to move transversely in the recess 262 of the gear 231. During such transverse movement of the rack 259 the rack causes the gear 226 to rotate through a predetermined angle relative to the plate shaft 203.

It will of course be apparent that during one revolution of the gear 231, and therefore of the plate shaft 203, the retainer shaft 204 will be rotated in one direction and that in the next revolution of the plate shaft 203 it will be rotated in the opposite direction.

The retainer shaft has a chart retainer 270 secured thereto which has a hub portion extending into the enlarged portion of the bore 220 and is secured to the retainer shaft by a bolt 271. An aligning pin 272a may be provided to extend in aligned bores of the retainer and of the retainer shaft to prevent any rotational movement therebetween. The enlarged forward portion 206 of the plate shaft has its forward front surface 272 bevelled or inclined and is provided with a slot 273 through which the radial extension 274 of the retainer 270 extends. The front surface 275 of the retainer 270 is also bevelled so that the forward surfaces of the plate shaft 203 and of the retainer 270 incline downwardly and forwardly when the chart plate is in such position that the driving pin 276 thereof is in an uppermost position. The slot 273 provides stop shoulders 277 and 278 against which opposite sides of the retainer extension 274 abut to limit movement of the retainer relative to the plate shaft and therefore to the plate itself.

The charts 280 are provided with peripheral radial slots 281 through which the driving and aligning pin 276 extends while alternate charts 280a and 280b are provided with central apertures 283 having an angularly extending radial slot 284a and 284b, respectively. The angular slots 284a and 284b are angularly displaced from one another so that when the radial extension 274 of the retainer is in alignment with the slots 284b of the charts 280b it is out of alignment with the slots 284a of the charts 280a.

The various gears of the transmission 202 are provided with gear teeth in proper ratio so that upon the completion of each revolution of the chart plate 207, whereupon the peripheral radial slots 281 extend at their highest point and open upwardly, the radial extension of the retainer 270 is moved from alignment with the radial slots 284a into alignment with the radial slots 284b and vice versa.

It will be apparent that at the beginning of one revolution of the chart plate 207 the radial extension 274 abuts the outer surface of a chart 280a and prevents it from falling free of the chart plate. Upon the completion of the next revolution of the chart plate 207 however, the retainer is rotated through the predetermined angle out of contact with the shoulder 278 and into contact with the shoulder 277 so that the radial extension 274 thereof moves into alignment with the slot 284a of such outermost chart 280a. The outermost chart 280a is then moved outwardly due to the action of the spring 212 and falls downwardly. The now downwardly and forwardly bevelled front surfaces of the retainer and of the chart shaft 203 facilitate such forward and downward displacement of the chart. The radial extension 274 of the retainer now abuts the outer surface of the now outermost chart 280b and holds the chart in place until the completion of the next revolution of the chart plate 207, whereupon the radial extension of the retainer plate is moved into alignment with the slot 284b of this chart 280b, which then falls free.

It will thus be seen that in this modified form of the chart changer the retainer oscillates through a predetermined angle into alignment with angularly displaced radial slots of alternate charts and of the stack of charts held on the chart plate 207 thereby and that the retainer shaft 204 during one revolution rotates in the same direction as the chart plate shaft 203 and in the next revolution of the chart plate 207 rotates in the opposite direction.

In FIGURES 12 and 13 is illustrated another retainer 270b which is similar in all respects to the retainer 270 except that it is provided with two radial extensions 274a and 274b which extend radially outwardly in opposite directions through slots 273a and 273b in the forward end of the enlarged portion 206 of the chart plate shaft 203. The charts 380a and 380b of course are provided with radial slots 381 and 382 respectively which extend in opposite directions from the central apertures 382 thereof and through which the radial extensions 274a and 274b of the retainer 270b may pass. The forward surface 275 of the retainer 270b and the forward surface 272 of the enlarged portion 206 of the chart plate shaft are bevelled to extend downwardly and outwardly whenever the driving and aligning pin 276 is in the uppermost position illustrated in FIGURE 7, so that the outermost chart will move forwardly and downwardly under the influence of gravity when the radial extensions 274a and 274b are aligned with the radial slots 381 or 382 respectively of the charts 380a or 380b, whichever is outermost. It will be apparent that the radial slots 381 and 382 are radially displaced so that upon the completion of each revolution of the chart plate the retainer 270b will be rotated relative to the chart plate to cause the radial extensions 274a and 274b to be aligned with the radial slots of the outermost chart whereby the outermost chart will be moved forwardly thereof to fall forwardly and downwardly free of the retainer, while the retainer extensions 274a and 274b engage the next chart 380a or 380b as the case may be to retain the stack of charts on the plate during the next revolution of the chart plate.

It will now be seen that several different modified forms of the chart changer have been illustrated and described, each of which is usable with a stack of charts which have radial slots extending from the central aperture thereof, alternate charts having such radal slots angularly displaced relative to one another, and that the changer is provided with a retainer which rotates relative to the chart plate and into alignment with the radial slot of the outermost chart upon the completion of each revolution of the chart plate to permit the outermost chart plate to fall free and be received in a suitable receptacle.

It will further be seen that the chart changer includes a prime mover and a transmission for simultaneously actuating the chart plate and the retainer to cause the chart plate to rotate continuously and to cause the retainer to move relative to the chart plate in alignment with the radial slot of the outermost chart upon the completion of each revolution of the chart plate.

It will further be seen that the chart changer includes a resilient means for phasing the chart plate forwardly whereby the outermost chart is pushed forwardly of the retainer whenever the retainer is aligned with its radial slot.

It will further be seen that the retainer is affixed to a retainer shaft which extends through a hollow shaft on which the chart plate is longitudinally movably mounted; and that in one form, the retainer shaft is rotated in the same direction as the chart plate but at a faster rate in order that the retainer will be aligned with the radial slot of the outermost chart upon the completion of each complete revolution of the chart plate.

It will also be seen that in the modified form of the chart changer illustrated in FIGURES 5 and 6, the transmission connecting the chart changer to the prime mover permits limited rotational movement of the retainer shaft relative to the prime mover and the chart plate upon the completion of each revolution of the chart plate whereby under the influence of a resilient means the retainer moves quickly through a predetermined angle to effect a quick release of the outermost chart.

It will further be seen that in still another modified form of the chart changer, the retainer shaft is oscillated to a predetermined angle to cause it, at the end of one revolution of the chart plate, to rotate in one direction and into alignment with the radial slot of the outermost chart; and, in the next revolution, to rotate in the opposite direction into alignment with the next outermost chart of the stack of charts on the chart plate.

It will further be seen that the transmission for oscillating the retainer upon the completion of each revolution of the chart plate includes a rack gear mounted on a gear which is rotatable with the chart shaft and engageable with cams which move radially to effect such oscillatory movement of the retainer shaft and retainer.

It will further be seen that new and improved charts for use with the chart changer embodying the invention have been illustrated and described which are circular in form and are provided with a central aperture having a radial slot extending outwardly from and communicating with the central aperture and that such charts are juxtaposed on the chart plate whereby the radial slots of alternate charts are radially angularly displaced from one another.

Figure 14:
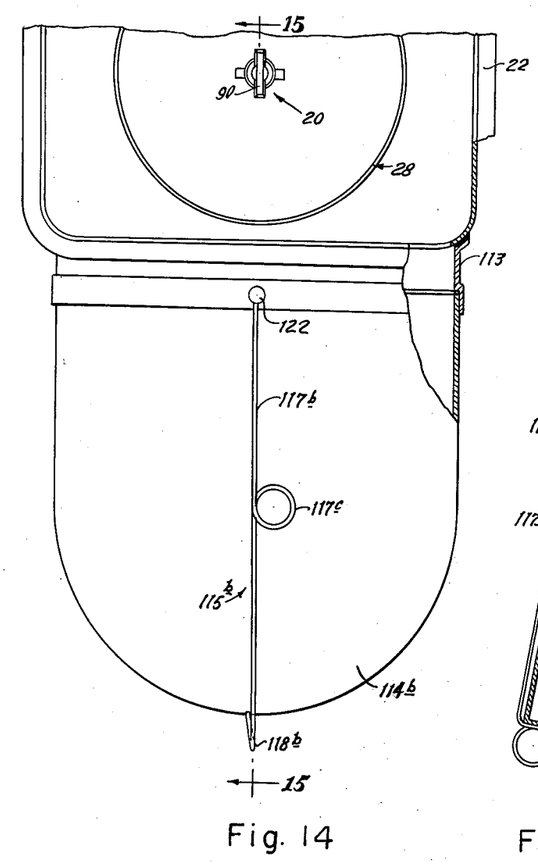
FIGURE 14 is a front view, with some portions broken away, of a modified form of a latch means for releasably connecting a chart receiver to the recording instrument.
Figure 15:
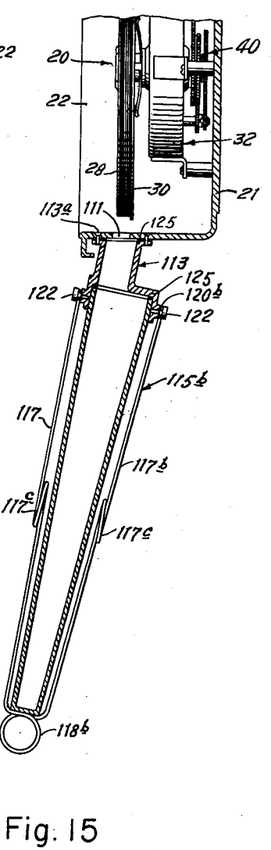
FIGURE 15 is a sectional view taken on line 15—15 of FIGURE 14.

In FIGURES 14 and 15 is illustrated another form of a latch 115b wherein the forward and rear arms 117b are each provided intermediate their ends with coils 117c. The forward and rear arms 117b are connected together at their lower ends by a coil 118b and their upper ends are provided with the hooks 120b which extend about the screws 122. The intermediate coils 117c provide for a greater resiliency of elongation of the arms 117b when a downward force or pull is applied to the latch 115b by a finger inserted in the coil 118b at the lower end of the latch.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A chart changer comprising: a substantially horizontal plate shaft; a chart plate longitudinally movably mounted on said plate shaft and rotatable therewith, said chart plate being disposed perpendicularly relative to said plate shaft; means biasing said chart plate forwardly on said plate shaft; a retainer carried by said plate shaft and disposed forwardly of said chart plate and extending radially outwardly to engage to stack of charts disposable on the chart plate; and charts having aligned central apertures in which the plate shaft is receivable and having radial slots extending radially from the central apertures, radial slots of the adjacent charts being radially angularly displaced from one another, the slots of adjacent charts being out of alignment; and means for rotating said plate shaft and for actuating said retainer to move the retainer into alignment with the radial slot of the outermost chart of the stack of charts to permit the outermost chart to fall free of the plate shaft upon a predetermined ratational movement of said chart plate, said means biasing said chart plate forwardly on said plate shaft moving said chart plate and said stack of charts and out of engagement with the outermost chart to permit the outermost chart to fall free of the plate shaft upon a predetermined rotational movement of said chart plate, said means biasing said chart plate forwardly on said plate shaft moving said chart plate and said stack of charts toward said retainer when said retainer is moved into alignment with the radial slot of the outermost chart to move the outermost chart forwardly relative to said retainer and cause it to fall free of said retainer and said plate shaft.

2. A chart changer comprising: a substantially horizontal plate shaft; a chart plate longitudinally movably mounted on said plate shaft and rotatable therewith, said chart plate extending perpendicular relative to said plate shaft; means biasing said chart plate forwardly on said plate shaft; a retainer disposed forwardly of said chart plate and extending radially outwardly to engage a stack of charts disposable on the chart plate; a retainer shaft, said retainer being detachably secured to one end of said retainer shaft outwardly of said chart plate and extending radially outwardly of the said plate shaft; said charts having aligned central apertures in which the plate shaft is receivable and having radial slots extending radially from the central apertures, radial slots of the adjacent charts being radially angularly displaced from one another, the slots of adjacent charts being out of alignment; means for rotating said plate shaft and for actuating said retainer to move the retainer into alignment with the radial slot of the outermost chart of the stack of charts and out of engagement with the outermost chart to permit the outermost chart to fall free of the plate shaft upon a predetermined rotational movement of said chart plate, said means biasing said chart plate forwardly on said plate shaft moving said chart plate and said stack of charts toward said retainer when said retainer is moved into alignment with the radial slot of the outermost chart to move the outermost chart forwardly relative to said retainer and to cause it to fall free of said retainer and said plate shaft.

3. A chart changer comprising; a substantially horizontal plate shaft; a chart plate longitudinally movably mounted on said plate shaft and rotatable therewith, said chart plate being positioned perpendicularly relative to said plate shaft; means biasing said chart plate forwardly on said plate shaft; a retainer disposed forwardly of said chart plate and extending radially outwardly to engage a stack of charts disposable on the chart plate; a retainer shaft, said retainer being detachably secured to one end of said retainer shaft outwardly of said chart plate and extending radially outwardly of the said plate shaft; said charts having aligned central apertures in which the plate shaft is receivable and having radial slots extending radially from the central apertures, radial slots of the adjacent charts being radially angularly displaced from one another, the slots of adjacent charts being out of alignment; means for rotating said plate shaft and for actuating said retainer to move the retainer into alignment with the radial slot of the outermost chart of the stack of charts and out of engagement with the outermost chart to permit the outermost chart to fall free of the plate shaft upon a predetermined rotational movement of said chart plate, said means biasing said chart plate forwardly on said plate shaft moving said chart plate and said stack of chart toward said retainer when said retainer is moved into alignment with the radial slot of the outermost chart to move the outermost chart forwardly relative to said retainer and cause it to fall free of said retainer and said plate shaft; a prime mover for rotating said plate shaft and actuating said retainer shaft; and transmission means connecting said prime mover and said shafts to cause said retainer shaft to rotate relative to said chart plate during each revolution of the chart plate to move the retainer into alignment with the radial slot of the outermost chart upon the completion of each revolution of the chart plate.

4. A chart changer comprising: a substantially horizontal plate shaft; a chart plate longitudinally movably mounted on said plate shaft and rotatable therewith, said chart plate being disposed perpendicularly relative to said plate shaft; means biasing said chart plate forwardly on said plate shaft; a retainer disposed forwardly of said chart plate and extending radially outwardly to engage a stack of charts disposable on the chart plate; a retainer shaft, said retainer being detachably secured to one end of said retainer shaft outwardly of said chart plate and extending radially outwardly of said plate shaft; said chart shaft being hollow; said retainer shaft extending through said hollow plate shaft; said charts having aligned central apertures in which the plate shaft is receivable and having radial slots extending radially from the central apertures, radial slots of the adjacent charts being radially angularly displaced from one another and overlying an unslotted portion of the next subjacent chart; and means for rotating said plate shaft and for actuating said retainer to move the retainer into alignment with the radial slot of the outermost chart of the stack of charts and out of engagement with the outermost chart to permit the outermost chart to fall free of the plate shaft upon a predetermined rotational movement of said chart plate, said means biasing said chart plate forwardly on said plate shaft moving said chart plate and said stack of charts toward said retainer when said retainer is moved into alignment with the radial slot of the outermost chart to move the outermost chart forwardly relative to said retainer and cause it to fall free of said retainer and said plate shaft.

5. A chart changer comprising: a substantially horizontal plate shaft; a chart plate longitudinally movably mounted on said plate shaft and rotatable therewith, said chart plate being disposed perpendicularly relative to said plate shaft means; biasing said chart plate forwardly on said plate shaft; a retainer disposed forwardly of said chart plate and extending radially outwardly to engage a stack of charts disposable on the chart plate; a retainer shaft, said retainer being detachably secured to one end of said retainer shaft outwardly of said chart plate and extending radially outwardly of the said plate shaft; said charts having aligned central apertures in which the plate shaft is receivable and having radial slots extending radially from the central apertures, radial slots of the adjacent charts being radially angularly displaced from one another, the slots of adjacent charts being out of alignment; means for rotating said plate shaft and for actuating said retainer to move the retainer into alignment with the radial slot of the outermost chart of the stack of charts and out of engagement with the outermost chart to permit the outermost chart to fall free of the plate shaft upon a predetermined rotational movement of said chart plate, said means biasing said chart plate forwardly on said plate shaft moving said chart plate and said stack of charts toward said retainer when said retainer is moved into alignment with the radial slot of the outermost chart to move the outermost chart forwardly relative to said retainer and cause it to fall free of said retainer and said plate shaft; said retainer and said plate shaft extending forwardly of said chart plate; said retainer having bevelled outer edges to facilitate downward and forward outward movement of the outermost chart past said retainer upon its release from the retainer.

6. A chart hanger comprising: a substantially horizontal plate shaft; a chart plate longitudinally movably mounted on said plate shaft and rotatable therewith, said chart plate being disposed substantially perpendicularly relative to said plate shaft; means biasing such chart plate in one direction on said plate shaft; a retainer disposed forwardly of said chart plate and extending radially outwardly to engage a stack of charts disposable on the chart plate; a retainer shaft, said retainer being detachably secured to one end of said retainer shaft outwardly of said chart plate and extending radially outwardly of the said plate shaft; said charts having aligned central apertures in which the plate shaft is receivable and having radial slots extending radially from the central apertures, the radial slots of the adjacent charts being radially angularly displaced from one another, the slots of adjacent charts being out of alignment; means for rotating said plate shaft and for actuating said retainer means upon the completion of each revolution of said chart plate to move the retainer into alignment with the radial slot of the outermost chart of the stack of charts to permit the outermost chart to fall free of the chart changer, said biasing means moving said chart plate forwardly toward said retainer when the retainer is moved into alignment with the radial slot of the outermost chart of the stack of charts to move the outermost chart forwardly relative to the retainer to cause the outermost chart to fall free of said plate shaft and said retainer and to move the next outermost chart of the stack of charts into engagement with said retainer; said plate shaft and said retainer having downwardly and forwardly bevelled surfaces for facilitating downward and forward movement of each chart past said retainer and said plate shaft as it is released by the movement of the retainer into alignment with its radial slot.

7. A chart changer comprising: a substantially horizontal plate shaft; a chart plate longitudinally movably mounted on said plate shaft and rotatable therewith, said chart plate extending substantially perpendicularly relative to said shaft plate; means biasing said chart plate forwardly on said plate shaft; a retainer disposed forwardly of said chart plate and extending radially outwardly to engage a stack of charts disposable on the chart plate; a retainer shaft, said retainer being detachably secured to one end of said retainer shaft outwardly of said chart plate and extending radially outwardly of the said plate shaft; said charts having aligned central apertures in which the plate shaft is receivable and having radial slots extending radially from the central apertures, radial slots of the adjacent charts being radially angularly displaced from one another, the slots of adjacent charts being out of alignment; means for rotating said plate shaft and for actuating said retainer to move the retainer into alignment with the radial slot of the outermost chart of the stack of charts and out of engagement with the outermost chart to permit the outermost chart to fall free of the plate shaft upon a predetermined rotational movement of said chart plate, said means biasing said chart plate forwardly on said plate shaft moving said chart plate and said stack of charts toward said retainer when said retainer is moved into alignment with the radial slot of the outermost chart to move the outermost chart forwardly relative to said retainer and cause it to fall free of said plate shaft and said retainer; said charts having peripheral outwardly opening radial slots; said chart plate having drive means extending through said slots.

8. In combination, a chart changer including: a plate shaft; a chart plate mounted on said plate shaft with the chart supporting face thereof disposed toward the outer end of said plate shaft, said chart plate being rotatable by said plate shaft and movable longitudinally thereof; means biasing said chart plate toward the outer end of said plate shaft, said plate shaft being hollow; a retainer shaft extending through said plate shaft; a retainer mounted on the outer end of said retainer shaft outwardly of said chart plate and rotatable with respect to said chart plate by said retainer shaft; drive means connected with the other end of said plate shaft and said retainer shaft for rotating said plate shaft and said retainer shaft to effect a predetermined rotational movement of said retainer shaft and said retainer with respect to said plate shaft and said chart plate upon a predetermined rotational movement of said plate shaft; and a stack of charts each having a central aperture therein through which the plate shaft extends and at least one substantially radially extending central slot communicating with the central aperture thereof, said central radial slot of each chart being angularly displaced from the central radial slot of the next adjacent chart and overlying an unslotted portion of the next adjacent chart; said retainer having a surface engaging the unslotted portion of the outermost chart of the stack of charts to retain said charts on said plate shaft, said retainer being of a size smaller than said central radial slot of said charts whereby the outermost chart may pass freely outwardly past the retainer when said retainer is aligned with said slot, said retainer surface then engaging the unslotted portion of the next adjacent chart to retain the balance of said charts on said plate shaft, said biasing means moving said chart plate toward said retainer when said retainer is aligned with the slot of the outermost chart to move said outermost chart forwardly relative to said retainer to cause said outermost chart to fall free and to cause the next outermost chart to move into engagement with said retainer.

9. The combination set forth in claim 8 wherein: said predetermined rotational movement of said retainer and retainer shaft with respect to said plate shaft and chart plate effects a rotational of said retainer shaft of one and one-fourth revolutions during each revolution of said plate shaft.

10. The combination of claim 8 wherein: the rotational movement of said retainer and retainer shaft with respect to said plate shaft and chart plate effects a rotation of said retainer shaft of three-quarters of one revolution during each complete revolution of said plate shaft.

11. The combination of claim 8 wherein: said retainer shaft extends outwardly of the outer end of said plate shaft; said retainer being detachably secured to said outer end of said retainer shaft and having the chart engaging surface thereon facing the outer chart supporting surface of said chart plate and disposed parallel to said supporting surface and in substantially the same plane as the outer end of the plate shaft.

12. The combination of claim 8 wherein: the outer end of the plate shaft and of the retainer have beveled surfaces thereon which are inclined downwardly and outwardly relative to the outer chart supporting surface of the chart plate upon the completion of each revolution of the chart plate.

13. A chart changer comprising: a substantially horizontal plate shaft; a chart plate longitudinally movably mounted on said plate shaft and rotatable therewith, said chart plate being disposed perpendicularly relative to said plate shaft; means biasing said chart plate forwardly on said plate shaft; a retainer disposed forwardly of said chart plate and extending radially outwardly to engage a stack of charts disposable on the chart plate; a retainer shaft disposed coaxially within said plate shaft, said retainer being detachably secured to one end of said retainer shaft outwardly of said chart plate and extending radially outwardly of the said plate shaft; said charts having aligned central apertures in which the plate shaft is receivable and having radial slots extending radially from the central apertures, radial slots of the adjacent charts being radially angularly displaced from one another, the slots of adjacent charts being out of alignment; drive means for rotating said plate shaft and for actuating said retainer to move the retainer into alignment with the radial slot of the outermost chart of the stack of charts and out of engagement with the outermost chart to permit the outermost chart to fall free of the plate shaft upon a predetermined rotational movement of said chart plate, said means biasing said chart plate forwardly on said plate said moving said plate shaft and said stack of charts toward said retainer when said retainer is moved into alignment with the radial slot of the outermost chart to move the outermost chart forwardly relative to said retainer and fall free of the plate shaft; drive means for transmission means connecting said drive means and said shafts to cause said retainer shaft to rotate relative to said chart plate during said predetermined rotational movement of said plate shaft said transmission means having a lost motion connection, and resilient means operatively associated with said transmission and said lost motion means for imparting a quick rotational movement to said retainer shaft relative to said plate shaft upon the completion of said predetermined rotational movement of said plate shaft.

14. For use with a chart plate of a chart changer having a peripherally disposed longitudinally extending drive means and a central shaft extending longitudinally in the same direction from the chart plate as the drive means: a stack of charts each having a central aperture through which the shaft may extend, a peripheral radial slot through which said driving means may extend and a central substantially radial slot communicating with the central aperture, the central radial slot of each chart being angularly displaced from the central radial slot of the adjacent charts and overlying an unslotted portion of the next subjacent chart of said stack of charts.

15. For use with a chart plate of a chart changer having a peripherally disposed longitudinally extending drive means and a central shaft extending longitudinally in the same from the chart plate as the drive means: a stack of charts each having a central aperture through which the shaft may extend, a peripheral radial slot through which said driving means may extend, and a central substantially radial slot communicating with the central aperture, the central radial slot of each chart being angularly displaced from the central radial slots of the adjacent charts by an angle of 90 degrees and overlying an unslotted portion of the next subjacent chart.

16. For use with a chart plate of a chart changer having a peripherally disposed longitudinally extending drive means and a central shaft extending longitudinally in the same direction from the chart plate as the drive means: a stack of charts each having a central aperture through which the shaft may extend, a peripheral radial slot through which said driving means may extend, and a central substantially radial slot communicating with the central aperture, the central radial slot of each chart being angularly displaced from the central radial slots of the adjacent charts by an angle of less than 90 degrees and overlying an unslotted portion of the next subjacent chart.

17. For use with a chart plate of a chart changer having a peripherally disposed longitudinally extending drive means and a central shaft extending longitudinally in the same direction from the chart plate as the drive means: a stack of charts each having a central aperture through which the shaft may extend and a peripheral radial slot through which said driving means may extend, and diametrically opposed radial slots extending outwardly from the central aperture, the opposed central radial slots of each chart being angularly displaced from the central radial slots of the adjacent charts and overlying an unslotted portion of the next subjacent chart.

18. A chart changer comprising: a substantially horizontal plate shaft; a chart plate longitudinally movably mounted on said plate shaft and rotatable therewith, said chart plate being disposed substantially perpendicularly relative to said plate shaft; means biasing said chart plate forwardly on said plate shaft; a retainer disposed forwardly of said chart plate for engaging the outermost chart of a stack of charts disposed on the chart plate, said charts having central apertures through which said plate shaft is receivable, said retainer holding said stack of charts on said plate shaft, said charts each having at least one slot extending outwardly substantially radially from the central aperture of said chart, the slots of adjacent charts being angularly displaced from one another and overlying an unslotted portion of the next subjacent chart; means for rotating said plate shaft; and means operably associated with said rotating means and with said retainer for moving said retainer relative to the stack of charts upon a predetermined rotational movement of said plate shaft to move the retainer into alignment with the slot of the outermost chart of the stack of charts and out of engagement therewith to permit the outermost chart to fall free of the shaft plate and into engagement with the next outermost chart of the stack of charts to retain the remaining charts on said plate shaft, said biasing means moving said chart plate toward said retainer when said retainer is moved into alignment with the central radial slot of the outermost chart to move the outermost chart forwardly relative to said retainer and to move the next outermost chart into engagement with said retainer.

19. A chart changer comprising: a substantially horizontal plate shaft; a chart plate mounted on said plate shaft and rotatable thereby, said chart plate being disposed substantially perpendicularly relative to said plate shaft and movable longitudinally of said plate shaft; means biasing said chart plate outwardly of said plate shaft; a stack of superposed charts disposed on said chart plate, said charts each having a central aperture through which the plate shaft is receivable and a radial slot extending outwardly from said central aperture, the slots of adjacent charts being angularly displaced from one another and overlying an unslotted portion of the next subjacent chart; a retainer supported by said plate shaft and disposed outwardly of said chart plate, said retainer engaging the outermost chart of said stack of charts for holding said stack of charts on said chart plate shaft; means for rotating said plate shaft; and means operatively associated with said rotating means and with said retainer for moving said retainer relative to the stack of charts upon a predetermined rotational movement of said plate shaft to move said retainer into alignment with the central radial slot of the outermost chart of the stack of charts and out of engagement therewith to permit said outermost chart to fall free of the plate shaft, said retainer having a surface then engaging the unslotted portion of the next subjacent chart of the stack of charts to retain the remaining charts on said plate shaft; said retainer surface engaging the outer surface of the outermost chart of the stack of charts and said retainer being of a size smaller than the central radial slot formed in said chart extending outwardly from the central aperture thereof whereby the retainer may pass freely through the slot and the chart may pass freely outwardly past the retainer when said retainer is aligned with said slot to permit the outermost chart to fall free of the retainer and the plate shaft, said retainer surface then engaging the unslotted portion of the next subjacent chart of the stack of charts to retain the remaining charts on said chart shaft.

20. In combination, a chart changer including: a plate shaft; a chart plate mounted on said plate shaft, said chart plate being rotatable by said plate shaft and movable longitudinally thereof; peripherally mounted chart drive means on said chart plate; means biasing said chart plate toward the outer end of said plate shaft, said plate shaft being hollow; a retainer shaft extending through said plate shaft; a retainer mounted on the outer end of said retainer shaft outwardly of said chart plate and rotatable with respect to said chart plate by said retainer shaft; means for rotating said plate shaft and said retainer shaft to effect a predetermined rotational movement of said retainer shaft and said retainer with respect to said plate shaft and chart plate upon a predetermined rotational movement of said plate shaft; and a stack of charts each having a central aperture therein through which the plate shaft may extend and a peripheral radial slot through which said drive means carried by said chart plate may extend, each chart of said stack of charts having at least one substantially radially extending central slot communicating with the central aperture thereof, said central slot of each chart being angularly displaced from the central radial slot of the adjacent charts and overlying an unslotted portion of the next subjacent chart; said retainer having a surface engaging the unslotted portion of the outermost chart of the stack of charts to retain said charts on said plate shaft, said retainer being of a size smaller than said central radial slot of said charts whereby the outermost chart may pass freely outwardly past the retainer when said retainer is aligned with said slot.

References Cited in the file of this patent

UNITED STATES PATENTS

| | | |
|---|---|---|
| 381,711 | Arnold | Nov. 19, 1907 |
| 1,720,148 | Rodanet | July 9, 1929 |
| 2,303,763 | Roberts | Dec. 1, 1942 |
| 2,328,703 | Becwar | Sept. 7, 1943 |
| 2,381,188 | Swindle | Aug. 7, 1945 |
| 2,703,745 | Smith | Mar. 8, 1955 |
| 2,926,059 | Squier | Feb. 23, 1960 |
| 2,978,287 | Daugherty | Apr. 4, 1961 |

FOREIGN PATENTS

| | | |
|---|---|---|
| 646,988 | Great Britain | Dec. 6, 1950 |